United States Patent Office 3,459,702
Patented Aug. 5, 1969

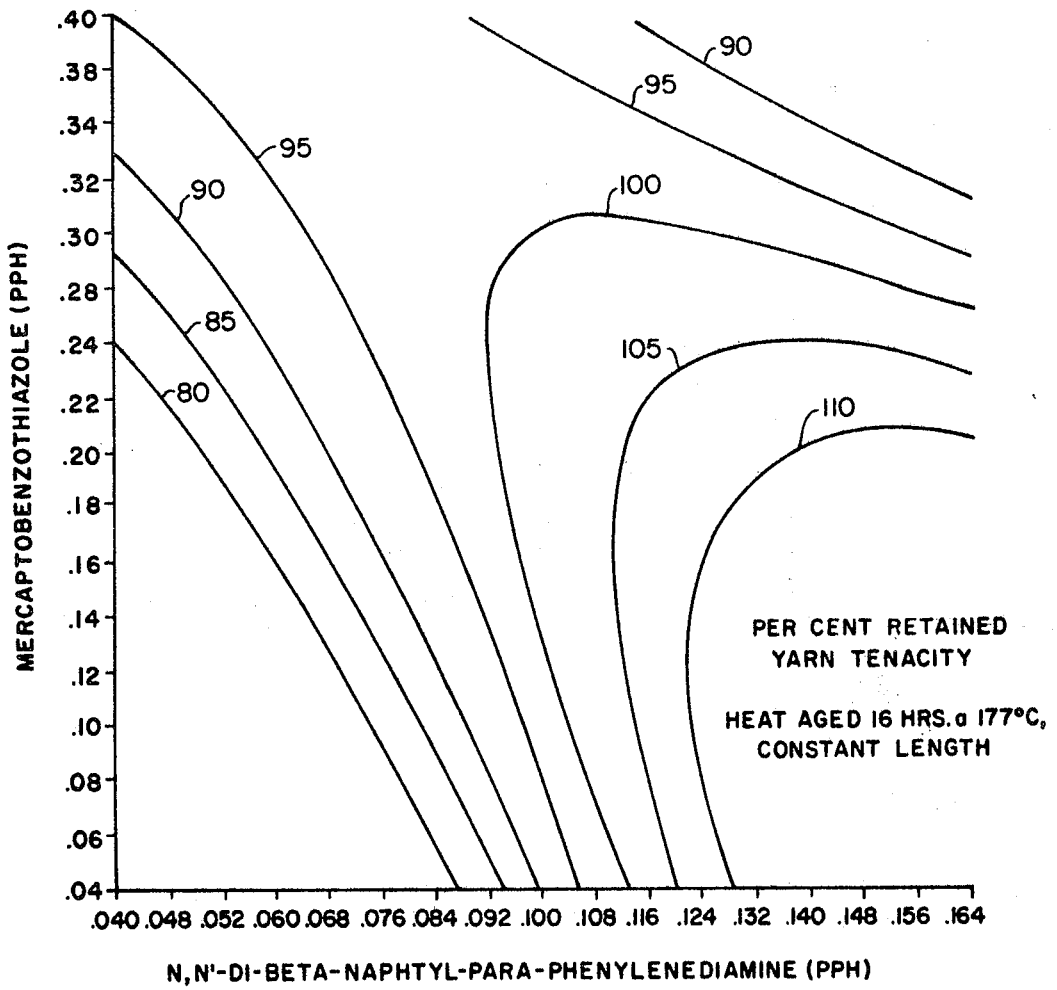

3,459,702
POLYAMIDES STABILIZED WITH MIXTURES OF MERCAPTOBENZOTHIAZOLE AND A SUBSTITUTED PHENYLENEDIAMINE
Joseph H. Tazewell, Akron, Ohio, assignor to The Firestone Tire & Rubber Company, Akron, Ohio, a corporation of Ohio
Filed Dec. 4, 1967, Ser. No. 687,564
Int. Cl. C08g 51/60
U.S. Cl. 260—45.8          14 Claims

ABSTRACT OF THE DISCLOSURE

This disclosure relates to a combination of stabilizers which have a synergistic effect in stabilizing polymeric linear polyamides, such as polycaprolactam (nylon 6) and polyhexamethylene adipamide (nylon 66), against thermal oxidation. This stabilization is evidenced by the high percentage of retained tenacity of fibers spun from the polymeric polyamides containing the combination as compared with fibers spun from the same material containing the same stabilizers individually. The particular combination of N,N' - di - beta - naphthyl-p-phenylenediamine and 2-mercaptobenzothiazole is found to have a much greater effect in stabilization of polyamide polymers against thermal oxidation than can be attributed to the additive effect of the combination. In fact 2-mercaptobenzothiazole by itself actually has a deletrious effect in this regard. However, in combination with the N,N'-di-beta-naphthyl-p-phenylenediamine it improves the stabilizing effect of the latter well over the effect produced by the latter alone.

BACKGROUND OF THE INVENTION

Field of the invention

The present invention relates to the stabilization of polymeric polyamides, such as polycaprolactam (nylon 6) and polyhexamethylene adipamide (nylon 66), against thermal oxidation.

Description of the related prior art

Graves U.S. Patent No. 2,278,350 discloses broadly the stabilization of linear polyamides by the use of aromatic amines containing amino hydrogen. Zapp U.S. Patent No. 3,308,091 discloses the combinations of copper compounds, cupric acetate, cupric chloride and mercaptobenzothiazole in a special polymeric polyamide having amine end groups. However when mercaptobenzothiazole is used by itself as a modifier in polymeric polyamides, it has a deleterious effect on the aging properties of the polyamide.

Although N,N' - di - beta-naphthyl-p-phenylenediamine has been found to be a satisfactory stabilizer for polyamides, the use of this material in the amounts required is relatively expensive.

SUMMARY OF THE INVENTION

It has now been found surprisingly that mercaptobenzothiazole (MBT), which acts adversely when tested by itself as a stabilizer for polyamides, has a synergistic effect on the stabilizing properties of N,N'-di-beta-naphthyl-p-phenylenediamine when the combination is used to stabilize polyamides, thereby permitting the use of much lower amounts of the much more expensive N,N'-di-beta-naphthyl-p-phenylenediamine or DBNP as it is sometimes hereinafter designated.

It is found that with approximately equal proportions of the two components a degree of stabilization of polymeric polyamide is obtained (as measured by the percent retained tenacity in fibers drawn from this material) that would require, in order to obtain an equivalent stabilization, a substantially larger amount of the DBNP alone than is used in the combination. Therefore this permits a considerable reduction in the amount of DBNP required and permits replacement of a part of the DBNP with a less expensive component.

The stabilizer composition of this invention is effective with various polymeric polyamides, including polycaprolactam (nylon 6), polyamides derived from dicarboxylic acids and diamines, such as adipic acid and hexamethylene diamine (nylon 66) and various related polyamides such as the fiber-forming polyamides described in U.S. Pats. 2,071,250; 2,071,253; 1,130,523 and 2,130,948. The stabilizer combination of this invention is particularly effective with polyamides having a molecular weight of 10,000 or more.

For producing the desired stabilizing effect, it is generally desirable to have at least 0.01% preferably at least 0.05% of each component, and also advantageously at least 0.05 preferably at least 0.10 parts per hunderd (p.p.h.) of the combination of the two components in the polyamide composition.

The drawing shows the stabilizing effect of the combinations of various proportions of the two components as reflected in improved retention of yarn tenacity in fibers produced from polyamides containing these stabilizers.

Various standard methods of mixing stabilizers or antioxidants with polyamides can be used for the purpose of this invention. The stabilizers can be added to the polyamides after they have been prepared or at an intermediate or an initial stage of preparation. Moreover solutions of the stabilizers can be maintained in contact with the polymeric polyamide so that the dissolved stabilizers are diffused into the polyamide and retained therein upon evaporation of the solvent.

DESCRIPTION OF SPECIFIC EMBODIMENTS

Various methods of practicing this invention are illustrated by the following examples. These examples are intended merely to illustrate the invention and not in any sense to limit the manner in which the invention can be practiced. The parts and percentages recited therein and all through the specification, unless specifically provided otherwise, are by weight.

Example I

The following mixture is placed in a bottle in which the atmosphere is displaced with nitrogen:

|   | Parts |
| --- | --- |
| Epsilon-caprolactam | 100 |
| n-Butylamine | 0.46 |
| Acetic acid | 0.26 |
| $Na_4P_2O_7 \cdot 10H_2O$ | 0.008 |
| Water | 1.4 |
| N,N' - di - beta - naphthyl - paraphenylenediamine (DBNP) | (1) |
| 2-mercaptobenzothiazole (MBT) | (1) |

[1] Amount indicated in table given below.

The bottle is sealed and heated in a circulating-air oven at 260° C. for 16 hours to form a low molecular weight polymer. This is removed from the bottle and ground in a Wiley mill. The polymer is then remelted in a resin kettle heated by a metal bath. Water and equilibrium lactam are stripped from the molten polymer at 0.2 mm. Hg and 260° C. The resultant polymer is again ground in a Wiley mill and dried under vacuum (1.0 mm. Hg) overnight at 80° C. The dried polymer is then melt spun into an 18 filament yarn which is subsequently drawn 4.0/1.0 over a hot plate at 310° F. The drawn yarn is aged on a metal rack, at constant length, in a circulating oven at 177° C. for 16 hours. The aged fiber tenacity is compared with the unaged tenacity and expressed as percent retained tenacity. From the table below it is seen that the stability of the yarn containing both DBNP and MBT is more than additive of the individual stabilities.

| Amount of stabilizer (p.p.h.) | | Percent retained tenacity in polyamide fiber heated at 177° C. for 16 hours |
|---|---|---|
| DBNP | MBT | |
| 0 | 0 | 22.2 |
| 0 | 0.2 | 10.8 |
| 0.1 | 0 | 77.8 |
| 0.1 | 0.1 | 94.7 |

Example II

The procedure of Example I is repeated a considerable number of times using various proportions of the two components DBNP and MBT. In each case a measurement is made of the percentage retained tenacity in fibers drawn from the resultant stabilized polyamide. The results are plotted as shown in the drawing. The respective curves are plotted for the indicated percentages for combinations of the amounts of the respective stabilizers which will give 80%, 85%, 90%, 95%, etc. of retained tenacity in the fibers. From these curves it is possible to determine more economical combinations of stabilizers which will give the desired tenacity retention or corresponding stabilization in the polyamide.

Example III

The procedure of Example I is repeated a number of times using the corresponding amounts of the respective stabilizers except that, in place of the polycaprolactam, a polyhexamethylene adipamide is used which is prepared as follows: an intimate mixture of 136 parts of hexamethylenediammonium adipate, 1.35 parts of hexamethylenediammonium acetate, and the respective amounts of DBNP and MBT is sealed under vacuum and heated for 2 hours at 215–220° C., then at atmospheric pressure in the presence of an inert atmosphere at 285° C. for one hour, and finally under reduced pressure for one hour at 285° C. The resultant superpolyamide is melt spun into fibers and tested for retained tenacity in accordance with the procedure of Example I. The results obtained are similar to those of Example I in that the combination of the two stabilizers results in higher retained tenacity than can be attributed to the additive results of the individual stabilizer components. When the amounts of the respective stabilizers are varied, stabilizations are obtained somewhat similar to those illustrated in the drawing.

The invention claimed is:

1. A composition comprising a polymeric linear polyamide having recurring amide groups as integral parts of the polymer chain, at least 0.01 percent by weight of N,N'-di-beta-naphthyl-para-phenylenediamine and at least 0.01 percent by weight of 2-mercaptobenzothiazole.

2. The composition of claim 1 which contains at least 0.05 percent by weight of said N,N'-di-beta-naphthyl-para-phenylenediamine.

3. The composition of claim 1 which contains at least 0.05 percent by weight of said 2-mercaptobenzothiazole.

4. The composition of claim 1 which contains at least 0.05 percent combined weight of said N,N'-di-beta-naphthyl-para-phenylenediamine and said 2-mercaptobenzothiazole.

5. The composition of claim 1 which contains at least 0.1 percent combined weight of said N,N'-di-beta-naphthyl-para-phenylenediamine and said 2-mercaptobenzothiazole.

6. The composition of claim 1 in which said polyamide is polycaprolactam.

7. The composition of claim 6 in which the combined weight of said N,N'-di-beta-naphthyl-para-phenylenediamine and said 2-mercaptobenzothiazole is at least 0.05 percent by weight.

8. The composition of claim 6 in which the combined weight of said N,N'-di-beta-naphthyl-para-phenylenediamine and said 2-mercaptobenzothiazole is at least 0.1 percent by weight.

9. The composition of claim 6 in which said polycaprolactam has a molecular weight of at least 10,000.

10. The composition of claim 9 in which the composition contains approximately 0.1 percent by weight of N,N'-di-beta-naphthyl-para-phenylenediamine and approximately 0.1 percent by weight of 2-mercaptobenzothiazole.

11. The composition of claim 1 in which said polyamide is polyhexamethylene adipamide.

12. The composition of claim 11 in which the combined weight of said N,N'-di-beta-naphthyl-para-phenylenediamine and said 2-mercaptobenzothiazole is at least 0.05 percent by weight.

13. The composition of claim 11 in which the combined weight of said N,N'-di-beta-naphthyl-para-phenylenediamine and said 2-mercaptobenzothiazole is at least 0.1 percent by weight.

14. The composition of claim 11 in which said polyhexamethylene adipamide has a molecular weight of at least 10,000.

References Cited

UNITED STATES PATENTS

| 2,630,421 | 3/1953 | Stamatoff | 260—45.8 |
| 3,275,594 | 9/1966 | Bond | 260—45.75 |
| 3,308,091 | 3/1967 | Zapp | 260—45.75 |

DONALD E. CZAJA, Primary Examiner

R. A. WHITE, Assistant Examiner

U.S. Cl. X.R.

260—45, 78